United States Patent
Fish et al.

(10) Patent No.: US 8,088,478 B2
(45) Date of Patent: Jan. 3, 2012

(54) BARRIER MATERIAL

(75) Inventors: David E. Fish, Bellevue, WA (US);
Michael J. Dougherty, Roy, WA (US);
Dwayne M. Shearer, Seattle, WA (US);
Amar N. Neogi, Kenmore, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 552 days.

(21) Appl. No.: 11/159,066

(22) Filed: Jun. 21, 2005

(65) Prior Publication Data

US 2006/0286367 A1  Dec. 21, 2006

(51) Int. Cl.
*B32B 9/00* (2006.01)
(52) U.S. Cl. ............... 428/323; 428/330; 428/537.5; 428/537.7
(58) Field of Classification Search ........... 428/34.8, 428/323, 332
See application file for complete search history.

(56) References Cited

U.S. PATENT DOCUMENTS

| | | |
|---|---|---|
| 3,298,831 A | 1/1967 | Ralph et al. |
| 4,169,823 A | 10/1979 | Jones |
| 4,613,632 A | 9/1986 | Aliani et al. |
| 4,661,537 A | 4/1987 | Ancker et al. |
| 4,795,768 A | 1/1989 | Ancker et al. |
| 4,994,112 A | 2/1991 | Majewicz |
| 5,389,709 A | 2/1995 | Itamura et al. |
| 5,418,057 A | 5/1995 | Tokiyoshi et al. |
| 5,492,953 A | 2/1996 | Itamura et al. |
| 5,506,011 A | 4/1996 | Farrell et al. |
| 5,506,036 A | 4/1996 | Bergerioux |
| 5,552,002 A | 9/1996 | Farrell et al. |
| 5,587,204 A | 12/1996 | Kinsey, Jr. et al. |
| 5,604,042 A | 2/1997 | Bianchini et al. |
| 5,658,622 A | 8/1997 | Berlin et al. |
| 5,958,999 A | 9/1999 | Bates et al. |
| 6,030,443 A | 2/2000 | Bock |
| 6,071,576 A | 6/2000 | Bentmar et al. |
| 6,194,040 B1 * | 2/2001 | Delius et al. .............. 428/34.8 |
| 6,383,582 B1 | 5/2002 | Salsti et al. |
| 6,383,589 B1 | 5/2002 | Horan |
| 6,441,076 B1 | 8/2002 | Boylan |
| 6,472,445 B1 | 10/2002 | Takahashi et al. |
| 6,569,539 B2 | 5/2003 | Bentmar et al. |
| 6,599,622 B1 * | 7/2003 | Chu et al. ................. 428/323 |

(Continued)

FOREIGN PATENT DOCUMENTS

CA  2060650  3/1991

(Continued)

OTHER PUBLICATIONS

Casey JP, *Pulp and Paper: Chemistry and Chemical Technology*, 2nd Ed,. "vol. II: Papermaking," p. 987-988, Interscience Pub., US (1967).

(Continued)

*Primary Examiner* — Timothy Speer
(74) *Attorney, Agent, or Firm* — John M. Crawford

(57) ABSTRACT

The barrier properties of a water soluble gas barrier material are improved if the material is blended with a nanoparticle calcium carbonate having a size of from 10 to 250 nanometers. The barrier material is on a substrate to provide a substrate with gas barrier properties. A layer of heat sealable material may be applied to the exposed surface of the barrier material. A method for making the barrier coated substrate is disclosed.

12 Claims, 5 Drawing Sheets

U.S. PATENT DOCUMENTS

| | | | |
|---|---|---|---|
| 6,605,344 B1 * | 8/2003 | Ohba et al. | 428/332 |
| 6,692,801 B1 | 2/2004 | Berlin et al. | |
| 6,887,928 B2 | 5/2005 | Tanzer et al. | |
| 2001/0005550 A1 | 6/2001 | Bentson et al. | |
| 2001/0036990 A1 | 11/2001 | Bobsein | |
| 2002/0127358 A1 | 9/2002 | Berlin et al. | |
| 2003/0021983 A1 | 1/2003 | Nohr et al. | |
| 2003/0049194 A1 | 3/2003 | Konno et al. | |
| 2003/0173045 A1 | 9/2003 | Confalone et al. | |
| 2003/0205319 A1 | 11/2003 | Bentson et al. | |
| 2004/0066446 A1 | 4/2004 | Yamaguchi et al. | |
| 2004/0105942 A1 * | 6/2004 | Cable | 428/34.2 |
| 2004/0161594 A1 * | 8/2004 | Joyce et al. | 428/304.4 |
| 2004/0209021 A1 | 10/2004 | Shih | |
| 2005/0133178 A1 | 6/2005 | Dougherty et al. | |
| 2005/0133179 A1 | 6/2005 | Dougherty et al. | |
| 2005/0133184 A1 | 6/2005 | Dougherty et al. | |
| 2005/0241790 A1 | 11/2005 | Dougherty et al. | |
| 2005/0247421 A1 | 11/2005 | Dougherty et al. | |
| 2005/0257907 A1 | 11/2005 | Dougherty et al. | |

FOREIGN PATENT DOCUMENTS

| | | |
|---|---|---|
| FI | 20020521 | 3/2002 |
| JP | 2001234124 | 8/2001 |
| JP | 2003362324 | 5/2005 |
| WO | WO 99/58331 | 11/1999 |
| WO | WO 00/40404 A | 7/2000 |
| WO | WO 02/18129 A | 3/2002 |
| WO | WO 03078734 A1 | 9/2003 |
| WO | 2005014283 A1 | 2/2005 |
| WO | WO 2005/047372 A | 5/2005 |

OTHER PUBLICATIONS

MacDonald RG, *Pulp and Paper Manufacture, 2$^{nd}$ Ed.*, "vol. III, Papermaking and Paperboard Making," Table 2-2, McGraw-Hill US (1950).

Strong, A. Brent: Plastics: materials and processing, 2nd edition; 2000; pp. 172-173; Prentice-Hall.

Combellick, W. A.; Encyclopedia of polymer science and engineering, vol. 2; 1985; John/Wiley & Sons; Barrier polymers pp. 176-192.

Delassus, Phillip; Kirk-Othmer Encyclopedia of Chemical Technology, 5th edition, vol. 3; 2004; Barrier polymers, pp. 375-407.

Unisource: Moisture barrier & oxygen barrier transmission rates, 2005, 1 page.

\* cited by examiner

| 18 |
|---|
| 10 |
| 12 |
| 16 |

Fig. 4

| 18 |
|---|
| 14 |
| 10 |
| 12 |
| 16 |

Fig. 5

| 10 |
|---|
| 12 |
| 16 |
| 20 |

Fig. 6

| 22 |
|---|
| 18 |
| 10 |
| 12 |
| 16 |
| 20 |

Fig. 7

| 22 |
|---|
| 18 |
| 14 |
| 10 |
| 12 |
| 16 |
| 20 |

Fig. 8

| |
|---|
| 18 |
| 14 |
| 10 |
| 12 |
| 24 |
| 26 |
| 16 |

Fig. 9

| |
|---|
| 18 |
| 14 |
| 10 |
| 12 |
| 28 |
| 24 |
| 26 |
| 16 |

Fig. 10

BARRIER MATERIAL

The field is packaging material. More specifically, it is a packaging paper, linerboard or paperboard that may be formed into food packages or into containers and cups and has oxygen barrier properties and the method of making the barrier coated packaging paper or paperboard.

The need for an oxygen barrier in paper, linerboard or paperboard packages is well known. Oxygen contacting the product reduces the shelf life of the product. The amount and rate of oxygen transfer will depend on the type of barrier layer or layers that is used. The oxygen barrier layer is laminated, extruded or co-extruded onto the paperboard to provide a board with oxygen barrier properties. Oxygen is the gas for which barriers are tested but the barriers are useful for other gases so the barriers are commonly termed gas barriers.

The most effective, and most costly, oxygen barrier has been an aluminum foil barrier. Food, such as chips, has been placed in foil or plastic pouches. Aluminum foil has also been used in juice containers. Plastic materials, such as nylon, have also been used as barrier materials. Many other materials have been proposed and used in order to reduce the cost of the barrier material. Each of these materials has attributes and shortcomings. Usually, a number of layers of different materials is provided with each layer having a special function. These functions might be the ease of attachment, a barrier for certain gases, a barrier for certain chemicals in the contained liquid, the ability to adhere two layers together, and the ability to seal the container. Each of these layers adds cost to the container, both in material cost and production cost.

The optimal barrier construction will also depend on whether the contained material is a dry product or a liquid.

An effective oxygen barrier will have an oxygen transfer rate (OTR) of 30 or less cubic centimeters of oxygen per square meter per day ($cc/m^2/day$) at standard temperature and pressure (STP) and 50% relative humidity (% RH). Water soluble or water dispersible oxygen barrier materials such as polyvinyl alcohol require large quantities of material per square meter to be effective. This is usually more material than can be applied in a coating application such as a size press without manufacturing difficulty. The oxygen transfer rate of a water soluble or water dispersible oxygen barrier material can be lowered if nanoparticle calcium carbonate is blended with the barrier material.

In one embodiment, a water soluble or water dispersible oxygen barrier layer is enhanced being blend with nanoparticle calcium carbonate. In another embodiment paperboard has oxygen barrier properties and uses a minimum number of extrusion or lamination layers. In another embodiment, the barrier layer need not be laminated or extruded onto the paperboard and the need for laminating or extruding layers onto the paperboard is minimized. In another embodiment a water soluble oxygen barrier material in solution or water dispersible oxygen barrier layer emulsion can be applied in a coating application such as a size press in effective amounts. In another embodiment, an effective OTR structure is formed by applying the water soluble barrier material in solution or water dispersible barrier material emulsion to the substrate. In another embodiment, an effective OTR structure is formed by applying the water soluble barrier material in solution or the water dispersible oxygen barrier material emulsion to the substrate and evening the barrier material using heat and pressure. In another embodiment, an effective OTR structure is formed by a applying a water soluble barrier material in solution or a water dispersible barrier material emulsion to the substrate and then extruding or laminating a plastic film onto the substrate and barrier material.

FIGS. 1-11 are cross-sectional views of barrier constructions.

In each of the FIGS. 1-11, 10 is a substrate. For the purposes of this application "substrate" is defined as a paper, linerboard or paperboard having a weight of 16 to 500 grams per square meter ($g/m^2$). Paper or linerboard would have weights of 16 to 340 $g/m^2$. Paperboard would have weights from 250 to 500 $g/m^2$.

Figure 1:
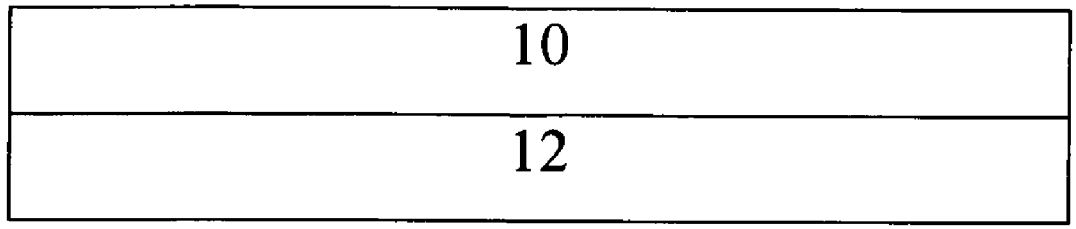

FIG. 1 is a diagram of one embodiment of the invention showing substrate 10 having a barrier layer or coating 12 on one surface. The paper construct could be used for a food pouch such as a potato chip bag. The paperboard construct could be used for a container for dry food. The barrier layer 12 could be either the inner or outer layer of the bag or container.

Figure 2:
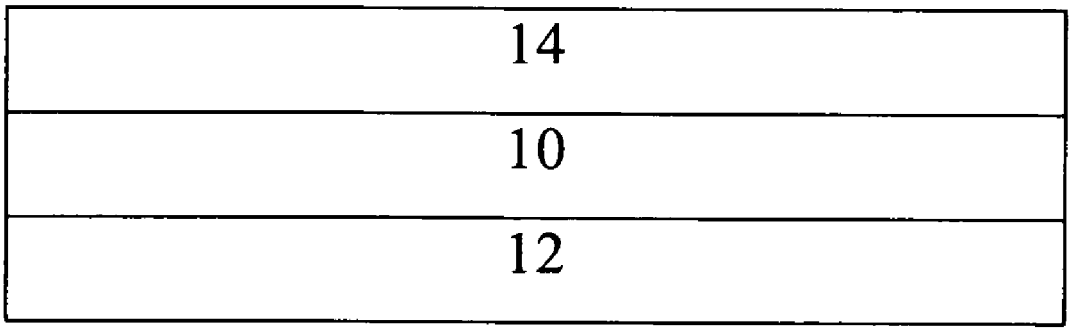

FIG. 2 is a diagram of another embodiment of the invention showing substrate 10 having a barrier layer or coating 12 on one surface of substrate 10 and a second barrier layer or coating 14 on the other surface of substrate 10. Again the paper construct could be used for a food pouch such as a chip bag, and the paperboard construct could be used for a container for dry food.

Figure 3:
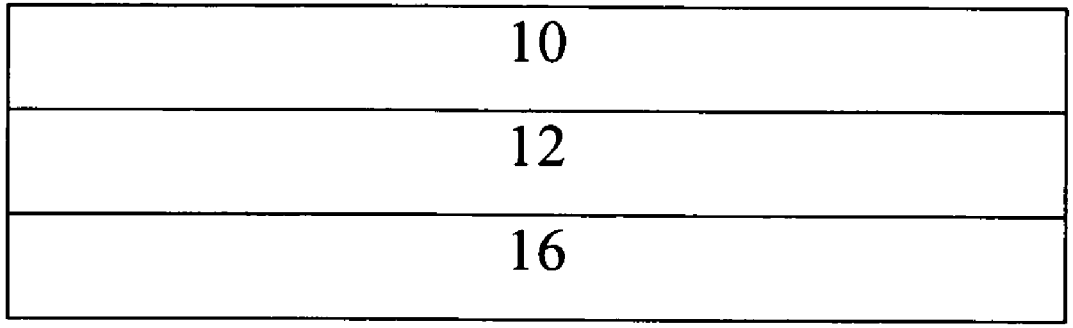

FIG. 3 is a diagram of another embodiment of the invention showing substrate 10 having a barrier layer or coating 12 on one surface of substrate 10 and a sealing layer 16 on the outer surface of the barrier layer opposite the substrate 10. Again the paper construct could be used for a food pouch and the paperboard construct could be used for a container. The barrier layer 12 and sealing layer 16 could be on the inside or outside of the pouch or container. The pouch or container can be used for dry products. If the barrier layer 12 and the sealing layer 16 is on the inside of the pouch, cup or container, the pouch, cup or container can be used to contain liquids.

Figures 4, 5, 6:
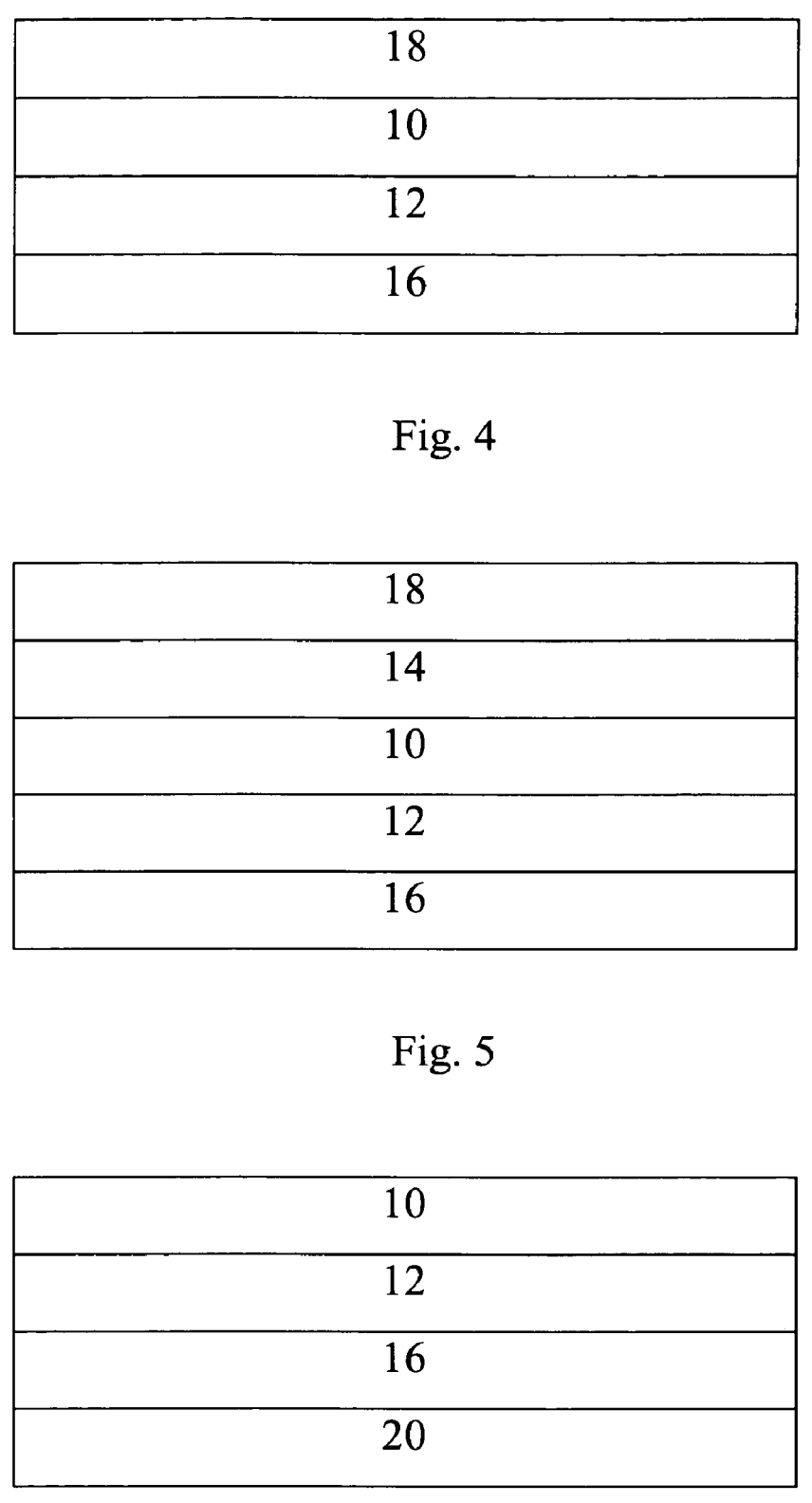

FIG. 4 is a diagram of another embodiment of the invention showing substrate 10 having a barrier layer or coating 12 on one surface of substrate 10, a sealing layer 16 on the outer surface of the barrier layer 12 opposite the substrate 10, and a second sealing layer 18 on the other surface of the substrate 10. Again the paper construct could be used for a food pouch and the paperboard construct could be used for a container or cup. The barrier coating could be on the inside or the outside of the pouch, cup or container construction. The pouches or containers can be used for dry products or liquids.

FIG. 5 is a diagram of another embodiment of the invention showing substrate 10 having a barrier layer or coating 12 on one surface of substrate 10, a sealing layer 16 on the outer surface of the barrier layer 12 opposite the substrate 10, a second barrier layer or coating 14 on the other surface of the substrate 10, and a second sealing layer 18 on the outer surface of barrier layer 14 opposite the substrate 10. Again the paper construct could be used for a food pouch and the paperboard construct could be used for a cup or container. The pouches, cups or containers can be used for dry products or liquids.

Several of the following Figures have one or more functional layers. The purpose of the functional layer on the outside of a container or pouch is to provide a good printing surface or to provide abrasion resistance. The purpose of a functional layer on the interior of a container is to provide a barrier to the liquid in the container or to elements of the liquid in the container such as limonene. In some embodiments the functional layer can be underneath the sealing layer.

FIG. 6 is a diagram of another embodiment of the invention showing substrate 10 having a barrier layer or coating 12 on one surface of substrate 10, a sealing layer 16 on the outer surface of the barrier layer 12 opposite the substrate 10, and a functional layer 20 on the outer surface of the sealing layer 16 opposite the barrier layer 12. Again the paper construct could be used for a food pouch and the paperboard construct could be used for a container. The barrier layer can be on the inside or the outside of the pouch or container. The pouches or containers can be used for dry products or, if the barrier layer and sealing layers are on the inside of the pouch or container, for liquids.

Figures 7, 8:
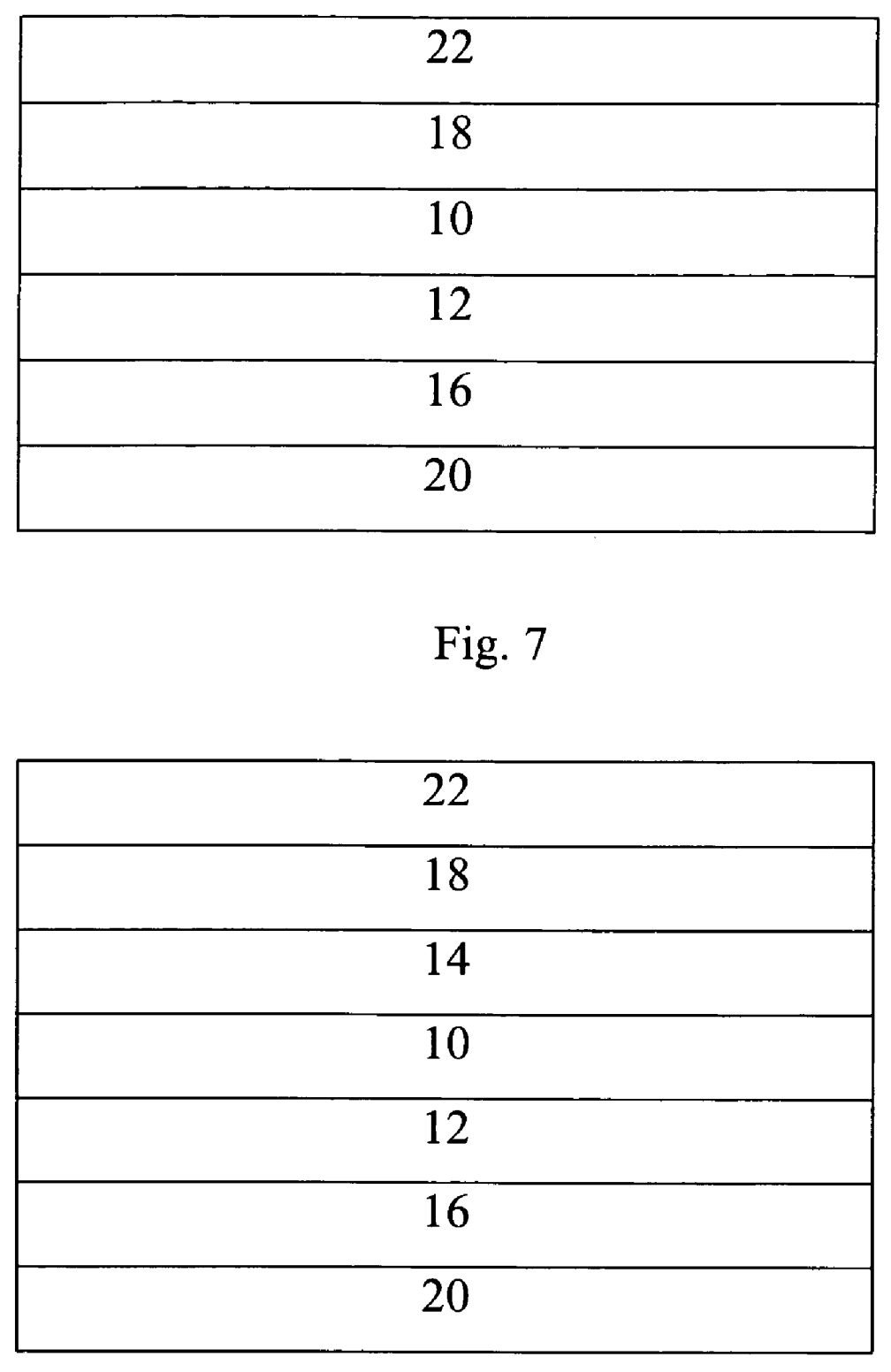

FIG. 7 is a diagram of another embodiment of the invention showing substrate 10 having a barrier layer or coating 12 on one surface of substrate 10, a sealing layer 16 on the outer surface of the barrier layer 12 opposite the substrate 10, a functional layer 20 on the outer surface of the sealing layer 16 opposite the barrier layer 12, a second sealing layer 18 on the other side of the substrate 10, and a second functional layer 22 on the outer surface of the second sealing layer 18 opposite the substrate 10. Again the paper construct could be used for a food pouch and the paperboard construct could be used for a container. The barrier layer can be on the inside or the outside of the pouch or container. The pouches or containers can be used for dry products or for liquids.

FIG. 8 is a diagram of another embodiment of the invention showing substrate 10 having a barrier layer or coating 12 on one surface of substrate 10, a sealing layer 16 on the outer surface of the barrier layer 12 opposite the substrate 10, a functional layer 20 on the outer surface of the sealing layer 16 opposite the barrier layer 12, a second barrier layer 14 on the other side of substrate 10, a second sealing layer 18 on the outer surface of barrier layer 14 opposite the substrate 10, and a second functional layer 22 on the outer surface of the second sealing layer 18 opposite the barrier layer 14. Again the paper construct could be used for a food pouch and the paperboard construct could be used for a container. The pouches or containers can be used for dry products or for liquids.

Figures 9, 10:
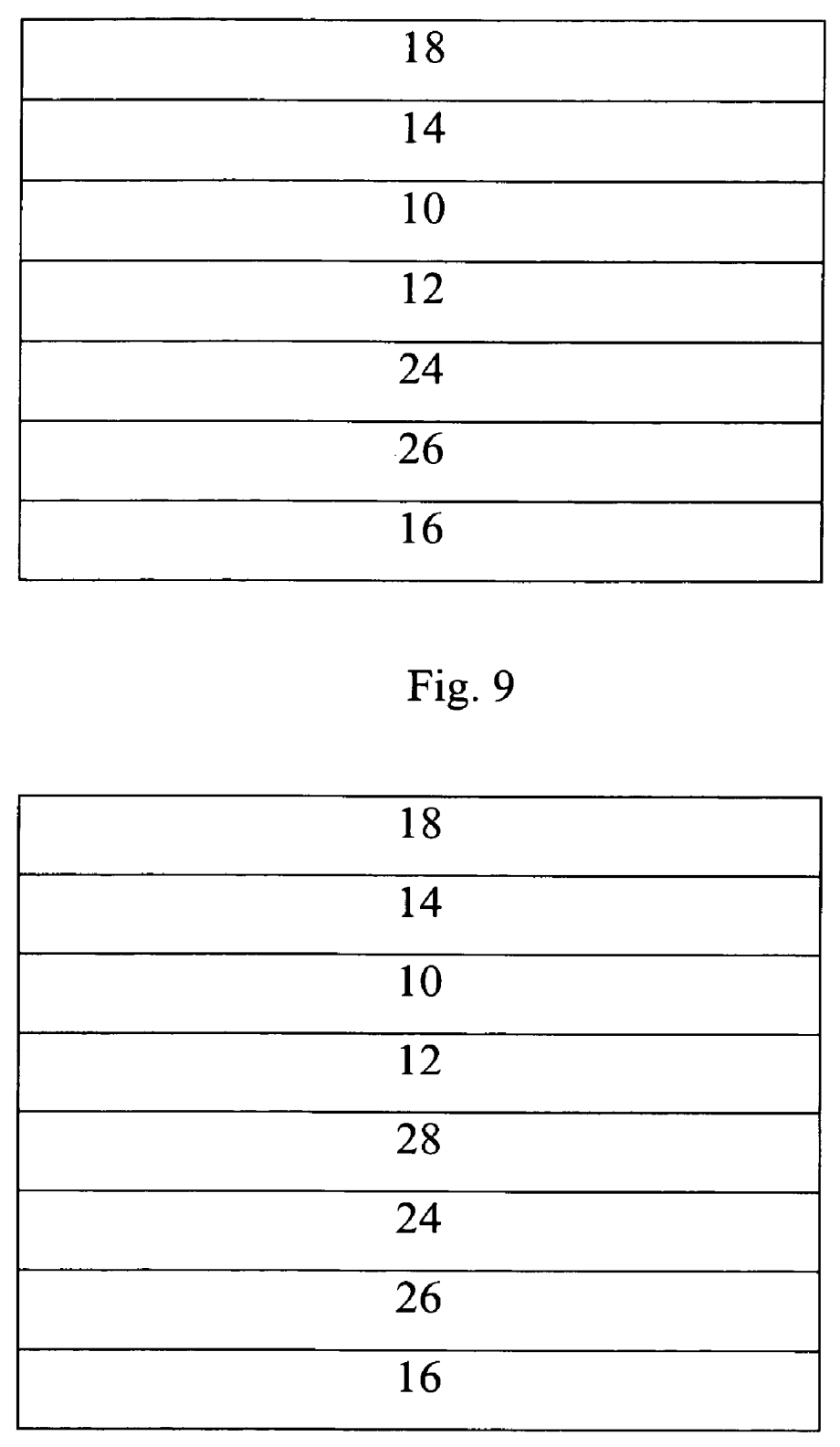
Figure 11:
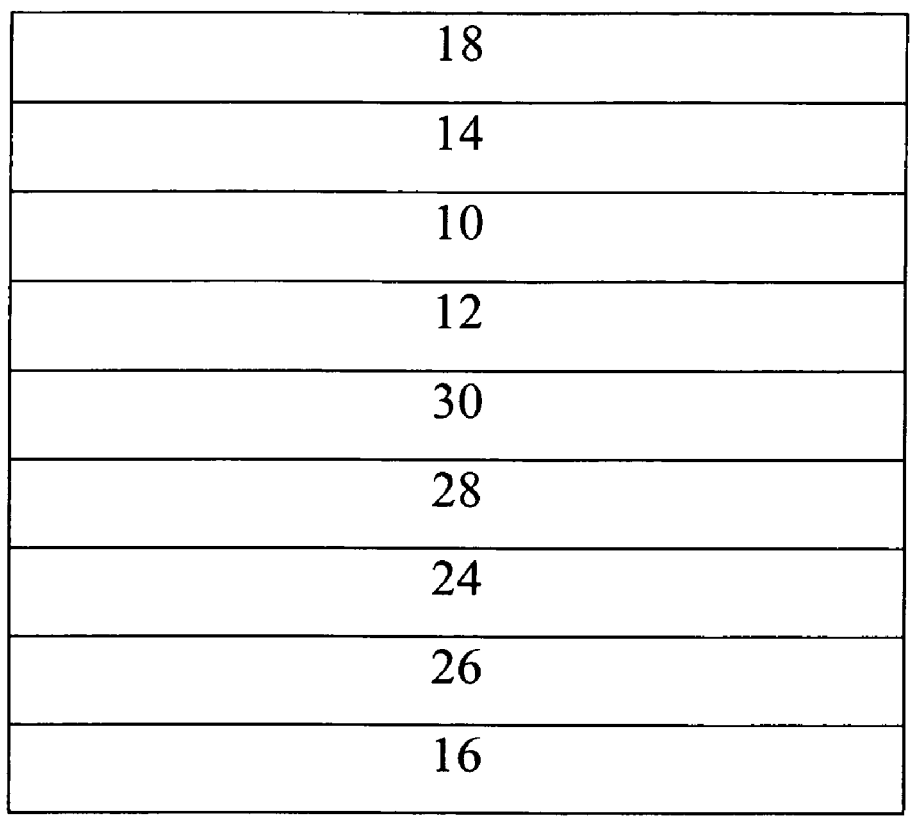

FIGS. 9-11 illustrate embodiments in which there are two different barrier materials on one side of the substrate. The second barrier material is denoted by 24. This barrier may be a second gas barrier, a barrier for other materials such as limonene barrier or a moisture barrier or liquid barrier. It may be a single layer or a multilayer material. Examples of this barrier material are a nylon such as an aliphatic nylon, an aromatic nylon, a metallocene catalyzed nylon, a blend of one or more of these nylons, ethylene vinyl alcohol, polyvinylidene chloride, oriented polyester terephthalate, polyvinyl chloride and polyacrylonitrile.

FIGS. 9-11 also include tie layers. Tie layers are adhesive layers that adhere the two layers on either side of the tie layer. A typical tie layer material is modified polyethylene, Surlyn® or Bynel®.

FIG. 9 is a diagram of another embodiment of the invention showing substrate 10 having a barrier layer or coating 12 on one surface of substrate 10, a layer 24 of a different barrier material on the outer surface of the barrier layer 12 opposite the substrate 10, a tie layer 26 on the outer surface of layer 24 opposite the barrier layer 12, a sealing layer 16 on the outer surface of the tie layer 26 opposite the layer 24, a second barrier layer or coating 14 on the other surface of the substrate 10, and a second sealing layer 18 on the outer surface of barrier layer 14 opposite the substrate 10. Again the paper construct could be used for a food pouch and the paperboard construct could be used for a cup or container. The pouches, cups or containers can be used for dry products or liquids.

FIG. 10 is a diagram of another embodiment of the invention showing substrate 10 having a barrier layer or coating 12 on one surface of substrate 10, a tie layer 28 on the outer surface of the barrier layer 12 opposite the substrate 10, a layer 24 of a different barrier material on the outer surface of the tie layer 28 opposite the barrier layer 12, a second tie layer 26 on the outer surface of layer 24 opposite the first tie layer 28, a sealing layer 16 on the outer surface of the second tie layer 26 opposite the layer 24, a second barrier layer or coating 14 on the other surface of the substrate 10, and a second sealing layer 18 on the outer surface of barrier layer 14 opposite the substrate 10. Again the paper construct could be used for a food pouch and the paperboard construct could be used for a cup or container. The pouches, cups or containers can be used for dry products or liquids.

FIG. 11 is a diagram of another embodiment of the invention showing substrate 10 having a barrier layer or coating 12 on one surface of substrate 10, a functional layer 30 on the outer surface of the barrier layer 12 opposite the substrate 10, a tie layer 28 on the outer surface of the sealing layer 30 opposite the barrier layer 12, a layer 24 of a different barrier material on the outer surface of the tie layer 28 opposite the sealing layer 30, a second tie layer 26 on the outer surface of layer 24 opposite the first tie layer 28, a sealing layer 16 on the outer surface of the second tie layer 26 opposite the layer 24, a second barrier layer or coating 14 on the other surface of the substrate 10, and a second sealing layer 18 on the outer surface of barrier layer 14 opposite the substrate 10. Again the paper construct could be used for a food pouch and the paperboard construct could be used for a cup or container. The pouches, cups or containers can be used for dry products or liquids.

In the Figures, the layers 16, 18, 20 and 22 and 30 may be low density polyethylene, linear low density polyethylene, medium density polyethylene, and metallocene catalyzed linear low density polyethylene and blends of these materials. In a liquid packaging board the inner layers 16 and 20 would also be moisture or liquid barrier materials, preventing the liquid within the pouch or container from entering the paperboard and would also adhere the ends of the container together.

The barrier layers 12 and 14 are water soluble or water dispersible barrier materials.

Examples of water soluble barrier materials are synthetically modified polysaccharides, cellulose derivatives such as carboxymethylcellulose (CMC), hydroxyethylcellulose (HEC), hydroxypropylcellulose, and hydroxypropylmethylcellulose (HPMC), chitosan, and synthetic polymers such as polyacrylamide (PAM), polyacrylic acid (PAA), polyethylene oxide (PEO), polyvinyl alcohol (PVOH or PVA), polymethacrylic acid (PMAA), polyamines, polyvinylpyridines and any salts of these materials. Polyvinyl alcohol is used in the examples.

Examples of water dispersible barrier materials are polyvinylidene chloride, polyvinyl chloride and ethylene vinyl alcohol.

As can be seen from examples 1-6, the water soluble or water dispersible barrier material by itself must be used in large quantities to be effective. The effectiveness of the water soluble or water dispersible barrier material depends on the thickness of the barrier. For example, a polyvinyl alcohol by itself would normally be used in amounts from 12 to 25 $g/m^2$ to be effective. However, a commercial size press may be able to apply only a maximum of 12 $g/m^2$. Rod or gravure or bent blade coaters could provide higher coating weights. A second problem is that applying a barrier coating of a polyvinyl alcohol (PVOH) solution in water to board leaves an uneven surface. In an uneven surface, the thin areas will disproportionately reduce the barrier properties.

Modifying the water soluble or water dispersible barrier material, such as polyvinyl alcohol, by adding even a small amount of nanoparticle calcium carbonate (NPCC) to a polyvinyl alcohol coating can significantly improve the oxygen barrier properties of the coating. For example, adding 20% by weight of NPCC to PVOH will reduce the oxygen transmission rate by a factor of more than 10—as shown in comparing example 4 from Table 1 and example 18 from Table 3. This allows the polyvinyl alcohol or other water soluble or water dispersible barrier to be used in amounts that can be applied by a size press, from 2 to 12 g/m$^2$. If a rod or bent blade coater is used then the amounts may be up to 40 g/m$^2$ and 20 g/m$^2$, respectively.

Nanoparticle calcium carbonate may be in several physical forms. These are particles, rods, needles and flakes. The particles have a size across the particle of 10 to 250 nanometers. The rods and needles have a diameter in the same size ranges of 10 to 250 nanometers. The rod has a length of 1 to 2 microns and the needle has a length of 1 to 3 microns. The flakes have a thickness in the size ranges of 10 to 250 nanometers. The length or width of the flake is in the range of 1 to 5 microns. For the purposes of this application, the term "size" means the size across the particle, the diameter of the rod or needle and the thickness of the flake.

In one embodiment nanoparticle calcium carbonate useful in the present invention has sizes in the range of 10 to 250 nanometers. In another embodiment nanoparticle calcium carbonate useful in the present invention has sizes in the range of 15 to 200 nanometers. In another embodiment nanoparticle calcium carbonate useful in the present invention has sizes in the range of 15 to 50 nanometers.

In one embodiment the weight ratios of nanoparticle calcium carbonate to water soluble or water dispersible barrier material can be from 1:100 to 1.5:1. In another embodiment, the weight ratios of NPCC to water soluble or water dispersible barrier can be from 1:25 to 1:1. In another embodiment, the weight ratios of NPCC to water soluble or water dispersible barrier can be from 1:4 to 1:8. The barrier material is in solution or emulsion.

This is an example of how the nanoparticle calcium carbonate may be blended with water soluble or water dispersible barrier material and coated on paper or paperboard. NPCC that is not agglomerated is diluted with the appropriate amount of water and then in turn mixed with a concentrated solution of the water soluble or water dispersible barrier material. For example 10 in Table 2, 9.3 g of a 48% slurry of NP-112 nanoparticle calcium carbonate from Nanomaterials Technology was thoroughly blended with 178.2 g of water. 112.5 g of Celanese Celvol 24203, a 24% solution of Celvol 203 polyvinyl alcohol in water, was then thoroughly mixed in. This coating was then put between the rollers of a 12 inch laboratory size press manufactured by Dayton Electric Mfg. Co. of Chicago, Ill. Eight inch square samples of 311 g/m$^2$ SBS paperboard produced by Weyerhaeuser Co. were then fed through the size press with a nip pressure setting of 40 and a nip speed setting 24. The coated samples were then laminated on both surfaces with a 2.5 mil 2-layer blown film consisting of a sealant layer being 1.0 mil Dow Primacor 1410 ethylene-acrylic acid co-polymer and the outside layer being 1.5 mil Dow 1059 high density polyethylene. The lamination equipment was a 2 foot by 2 foot flat press run at 5 tons pressure at 300° F. (149° C.) with a dwell time of 2 minutes.

The oxygen transmission rate (OTR) is given in cubic centimeters (cc) of oxygen transmitted through square meter (m$^2$) of paper or paperboard in a day at standard temperature and pressure. The transmission rate is measured by the following test. Circular samples 70 mm in diameter are cut from the laminated board. An adhesive backed foil mask with a 45 mm hole in the center is applied to both sides of the sample, and the masked sample is trimmed down to a 100 mm circle. The samples are inserted into an Illinois Instruments 8000 Oxygen Transmission Analyzer. Using the instruments standard procedure the OTR is measured at 23° C. and a preset humidity.

In the first set of examples, looking to FIG. 8, a board having the a 36 g/m$^2$ high density polyethylene layer 22, a 24 g/m$^2$ ethylene-acrylic acid co-polymer layer 18, a polyvinyl alcohol (PVOH) layer 14, a 311 g/m$^2$ paperboard substrate layer 10, a polyvinyl alcohol (PVOH) layer 12, a 24 g/m$^2$ ethylene-acrylic acid co-polymer layer 16, and a 36 g/m$^2$ high density polyethylene layer 20 was tested for oxygen transmission rate in both a 50% relative humidity (RH) environment and a 90% relative humidity environment. The amount of PVOH was varied as shown in Table 1.

TABLE 1

| Example | PVOH g/m$^2$ total (from both sides) | OTR (cc/m$^2$/day) 50% RH | | | | 90% RH |
|---|---|---|---|---|---|---|
| | | #1 | #2 | Average | standard deviation | |
| 1 | 2.0 | 33.2 | 37.8 | 35.5 | 3.3 | — |
| 2 | 3.8 | 25.0 | 23.0 | 24.0 | 1.4 | — |
| 3 | 4.8 | 24.0 | 25.4 | 24.7 | 1.0 | — |
| 4 | 15.8 | 1.1 | — | 1.1 | — | 1.3 |
| 5 | 18.5 | 1.3 | — | 1.3 | — | 1.3 |
| 6 | 21.0 | 0.1 | 0.1 | 0.1 | 0.0 | — |

In the second set of examples, looking to FIG. 8, a board having the a 36 g/m$^2$ high density polyethylene layer 22, a 24 g/m$^2$ ethylene-acrylic acid co-polymer layer 18, a polyvinyl alcohol (PVOH) layer and nanoparticle calcium carbonate 14, a 311 g/m$^2$ paperboard substrate layer 10, a polyvinyl alcohol (PVOH) and nanoparticle calcium carbonate layer 12, a 24 g/m$^2$ ethylene-acrylic acid co-polymer layer 16, and a 36 g/m$^2$ high density polyethylene layer 18 was tested for oxygen transmission rate in both a 50% relative humidity (RH) environment and a 90% relative humidity environment. The amount of PVOH and nanoparticle calcium carbonate was varied as shown in Table 2. The purpose of these examples was to vary the weight of polyvinyl alcohol and maintain the ratio of nanoparticle calcium carbonate to polyvinyl alcohol.

TABLE 2

| Ex. | PVOH g/m$^2$ | NPCC g/m$^2$ | Total g/m$^2$ | NPCC/PVOH | OTR (cc/m$^2$/day) 50% RH | | | | | | 90% RH |
|---|---|---|---|---|---|---|---|---|---|---|---|
| | | | | | #1 | #2 | #3 | #4 | avg. | SD | |
| 7 | 3.1 | 0.5 | 3.6 | 0.16 | 16.6 | 10.8 | — | — | 13.7 | 4.1 | — |
| 8 | 3.5 | 0.6 | 4.1 | 0.17 | 10.4 | 8.8 | — | — | 9.6 | 1.1 | — |
| 9 | 5.8 | 1.0 | 6.8 | 0.17 | 1.5 | 1.4 | — | — | 1.5 | 0.1 | — |

TABLE 2-continued

| | PVOH | NPCC | Total | NPCC/PVOH | OTR (cc/m²/day) 50% RH | | | | | | 90% RH |
|---|---|---|---|---|---|---|---|---|---|---|---|
| Ex. | g/m² | g/m² | g/m² | | #1 | #2 | #3 | #4 | avg. | SD | |
| 10 | 6.5 | 1.1 | 7.6 | 0.16 | 2.0 | 2.1 | 3.2 | 5.2 | 3.1 | 1.5 | — |
| 11 | 9.0 | 1.5 | 10.5 | 0.17 | 0 | 2.6 | — | — | 1.3 | 1.8 | — |
| 12 | 10.0 | 1.7 | 11.7 | 0.17 | 0.5 | 3.1 | — | — | 1.8 | 1.8 | — |
| 13 | 15.0 | 2.5 | 17.5 | 0.17 | 2.5 | 0.7 | — | — | 1.6 | 1.2 | — |
| 14 | 18.0 | 3.0 | 21 | 0.17 | 0.4 | 0.2 | — | — | 0.3 | 0.1 | — |
| 15 | 23.0 | 3.9 | 26.9 | 0.17 | 0.1 | — | — | — | 0.1 | — | 0.1 |

In the third set of examples, the board construction was the same as in the second set of examples. In this set the ratio of nanoparticle calcium carbonate and polyvinyl alcohol was varied as shown in table 3.

TABLE 3

| | PVOH | NPCC | Total | NPCC/PVOH | OTR (cc/m²/day) 50% RH | | | | | | 90% RH |
|---|---|---|---|---|---|---|---|---|---|---|---|
| Ex. | g/m² | g/m² | g/m² | | #1 | #2 | #3 | #4 | avg. | SD | |
| 16 | 7.6 | 0.3 | 7.9 | 0.04 | 2.0 | 2.4 | — | — | 2.2 | 0.3 | — |
| 17 | 3.1 | 0.3 | 3.4 | 0.10 | 7.5 | 8.2 | — | — | 7.9 | 1.5 | — |
| 18 | 15.4 | 3.1 | 18.5 | 0.20 | 0.1 | — | — | — | 0.1 | — | 0.2 |
| 19 | 13.1 | 6.5 | 18.6 | 0.50 | 0.3 | — | — | — | 0.3 | — | 0.5 |
| 20 | 4.0 | 4.0 | 8.0 | 1.00 | 0.9 | 2.6 | — | — | 1.8 | 1.2 | — |
| 21 | 11.6 | 11.6 | 23.2 | 1.00 | 0.3 | — | — | — | 0.3 | — | 1.1 |

In the fourth set of examples, polyvinyl alcohol and nanoparticle calcium carbonate was blended with starch. The starch was Penford Gum 290 nonionic starch manufactured by Penford. Other papermaking starches may be used. The weight of starch was maintained at 43% of the total weight of the solids in the layer. Starch was added because it contributes to ease of coating. In one embodiment the starch may be up to 70% of the total weight of the solids in the layer. In another embodiment the starch may be up to 50% of the total weight of the solids in the layer. The amount of starch may be between 0% and 70% depending on the specific application of the oxygen barrier material. One reason for using the starch is for easier application of the oxygen barrier materials.

TABLE 4

| | PVOH | NPCC | Total | NPCC/PVOH | Starch | Total | OTR (cc/m²/day) 50% RH | | | | 90% RH |
|---|---|---|---|---|---|---|---|---|---|---|---|
| Ex. | g/m² | g/m² | g/m² | | g/m² | g/m² | #1 | #2 | Avg. | SD | RH |
| 22 | 2.5 | 0.4 | 2.9 | 0.16 | 2.2 | 5.1 | 21.3 | 28.0 | 24.7 | 4.7 | — |
| 23 | 3.8 | 0.6 | 4.4 | 0.16 | 3.3 | 7.7 | 28.6 | 27.3 | 28.0 | 0.9 | — |
| 24 | 4.4 | 0.7 | 5.1 | 0.16 | 3.8 | 8.9 | 21.5 | 22.5 | 22.0 | 0.7 | — |
| 25 | 11.5 | 1.9 | 13.4 | 0.17 | 7.6 | 21.0 | 0.3 | 0.4 | 0.3 | 0.1 | — |

The number of layers of material used in these test was necessary because they were laboratory samples and needed to be made under laboratory conditions.

Figure 12:
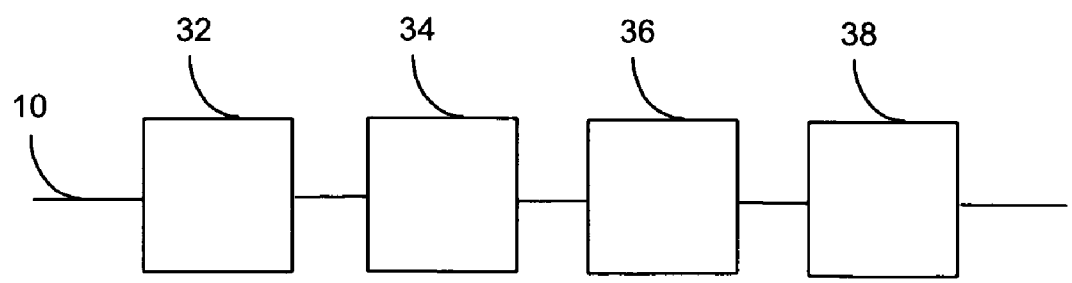
FIG. 12 is a diagram of an apparatus for applying the barrier coating.

The method of making the coated substrate in commercial production is diagrammed in FIG. 12. The substrate 10 is carried into a coating station 32 in which the water soluble or water dispersible barrier material containing nanoparticle calcium carbonate would be added. The apparatus at the coating station can be a size press. Depending on the orientation of the press, one or both sides of the substrate would be coated. A rod or bent blade or gravure coater could be used in place of the size press.

After application in a paper machine the barrier in the coated substrate is exposed to temperatures above the glass transition temperature from contact with hot dryer cans in dryer station 34 and heated smoothing rolls called "calender" rolls or nips in calender station 36. Significant pressure on the order of 175 to 225 N/mm is applied in the calender nips. The calenders may be steel roll calenders, lagged calenders, soft nip calenders, extended nip calenders or shoe calenders. In one embodiment a soft nip calender is followed by an extended soft nip calender or shoe calender. It has been found that this application of heat and pressure further reduces the oxygen transfer rate of the barrier coating. It is believed that this improvement in barrier properties is caused by heat and pressure producing a more uniform coating thickness. For purposes of this application this barrier coating which has been treated with heat and pressure will be called a "uniform barrier coating".

Some products go through a further extrusion process in extrusion station 38 wherein the barrier may be exposed to an open flame in an operation that helps plastic adhere to paperboard. The extrusion process also involves a curtain of plastic at 200° to 300° C. contacting the board and then going through a nip formed by a chilled pressure roll and a backing roll. All these operations may further improve the barrier coating uniformity. The layers of material are exemplified by the layers shown in FIGS. 3-11.

Although these sheets were laminated with non-barrier films, extrusion coating or mere heat and pressure such as from a calender roll should also have the same effect of producing a better barrier material than one that has not been treated with heat and pressure.

Those skilled in the art will note that various changes may be made in the embodiments described herein without departing from the spirit and scope of the present invention.

The invention claimed is:

1. A construct having an oxygen barrier property comprising a two layer structure consisting of a first and second attached layers, the first layer being a layer of paper, linerboard or paperboard only, the second layer being a single layer comprising a blend of a nanoparticle calcium carbonate having a size in the range of 10 to 250 nanometers and at least one of a water soluble oxygen barrier material, a water dispersible oxygen barrier material, and a mixture thereof, the weight ratio of nanoparticle calcium carbonate to said water soluble or water dispersible oxygen barrier material being in the range of 1:100 to 1.5:1 and a layer of at least one of a different barrier material, a sealing material, nylon and polyethylene on the side of said second layer opposite said first layer, wherein the construct has a uniform barrier coating and an oxygen transfer rate (OTR) of 30 or less cubic centimeters of gaseous oxygen per square meter per day (cc/m$^2$/day) at standard temperature and pressure and 50% relative humidity.

2. The construct of claim 1 in which the water soluble oxygen barrier material is at least one of carboxyalkylcellulose, hydroxyethylcellulose, hydroxypropylcellulose, hydroxypropylmethylcellulose, chitosan, polyacrylamide, polyacrylic acid, polyethylene oxide, polyvinyl alcohol, polymethacrylic acid, polyamines, polyvinylpyridines, and salts of these compounds, and mixtures of any of these materials.

3. The construct of claim 1 in which the water dispersible oxygen barrier material is at least one of polyvinylidene chloride, polyvinyl chloride, ethylene vinyl alcohol and mixture of any of these materials.

4. The construct of claim 1 in which the second layer further comprises starch.

5. The construct of claim 4 in which the starch is present in an amount of 0.1% to 70% of the total weight of the solids in the oxygen barrier material.

6. The construct of claim 1 in which said nanoparticle calcium carbonate is present in a weight ratio of nanoparticle material to water soluble or water dispersible barrier material of 1:25 to 1:1.

7. The construct of claim 1 in which said nanoparticle calcium carbonate is present in a weight ratio of nanoparticle material to water soluble barrier material of 1:4 to 1:8.

8. The construct of claim 1 in which said water soluble or water dispersible oxygen barrier material is coated on the first layer.

9. The construct of claim 1 further comprising another layer of material on the side of the first layer opposite the second layer.

10. The construct of claim 9 further comprising a second layer of material on the side of the second layer opposite the first layer.

11. The construct of claim 1 in which said nanoparticle calcium carbonate having a size in the range of 15 to 200 nanometers.

12. The construct of claim 1 in which said nanoparticle calcium carbonate having a size in the range of 15 to 50 nanometers.

* * * * *